(12) United States Patent
Mizuochi

(10) Patent No.: US 7,110,681 B1
(45) Date of Patent: Sep. 19, 2006

(54) METHOD AND APPARATUS FOR OPTICAL TRANSMISSION

(75) Inventor: Takashi Mizuochi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 642 days.

(21) Appl. No.: 10/129,971

(22) PCT Filed: Oct. 13, 2000

(86) PCT No.: PCT/JP00/07130

§ 371 (c)(1),
(2), (4) Date: May 22, 2002

(87) PCT Pub. No.: WO02/33921

PCT Pub. Date: Apr. 25, 2002

(51) Int. Cl.
*H04B 10/04* (2006.01)

(52) U.S. Cl. ............... 398/183; 398/182; 398/186; 398/188; 398/189; 398/190; 398/191; 398/192; 398/193; 398/194; 398/202; 398/208; 398/214; 398/140; 398/141; 398/147; 398/158; 398/159; 375/286; 375/287; 375/292; 375/261; 341/53

(58) Field of Classification Search ............... 375/286, 375/17, 56, 206, 43, 232, 60, 292, 287, 261; 359/173, 181, 161, 115; 341/53; 326/83; 360/29; 398/140, 141, 147, 158, 159, 182, 398/183, 190, 191, 192, 193, 194, 202, 208, 398/214, 186, 188, 189

See application file for complete search history.

(56) References Cited

U.S. PATENT DOCUMENTS 4,464,765 A * 8/1984 Shimizu ............... 375/292
5,867,534 A * 2/1999 Price et al. ............ 375/286
5,969,646 A * 10/1999 Cheng et al. .......... 341/53

FOREIGN PATENT DOCUMENTS

| EP | 0 977 382 A2 | 2/2000 |
|---|---|---|
| JP | 54-48102 | 4/1979 |
| JP | 2752/1982 | 1/1982 |
| JP | 138748/1988 | 9/1988 |
| JP | 1-223837 | 9/1989 |
| JP | 2-17745 | 1/1990 |
| JP | 2-301250 | 12/1990 |
| JP | 5-14419 | 1/1993 |
| JP | 5-14420 | 1/1993 |
| JP | 9-181705 | 7/1997 |
| JP | 11-55331 | 2/1999 |
| JP | 2000-31946 | 1/2000 |

OTHER PUBLICATIONS

Sheldon Walklin et al.: "Multilevel signaling for increasing the reach of 10 Gb/s lightwave system", IEEE Journal of Lightwave Technology, vol. 17, No. 11, pp. 2235-2248 Nov. 1999.
B. Wedding et al.: "Mulit-level dispersion supported transmission at 20 GBIT/S over 46 KM Installed standard singlemode fibre" 22$^{nd}$ European Conference on Optical Communication-ECOC '96, Mob 4.4, pp. 1.91-1.94.
Gustav Veith: "European 40 Gbit/s field tests" ECOC'99, pp. 82-83 Sep. 26-30 1999, Nice, France.
Berthold Wedding et al.: "40 Gbit/s quatemary dispersion supported transmission over 31 km standard singlemode fibre without optical dispersion compensation" ECOC'98, pp. 523-524 Sep. 20-24, 1998, Madrid, Spain.

* cited by examiner

*Primary Examiner*—Hanh Phan
(74) *Attorney, Agent, or Firm*—Oblon, Spivak, McClelland, Maier & Neustadt, P.C.

(57) ABSTRACT

Binary information is subjected to RZ encoding and multilevel encoding, and the encoded signal is optically modulated.

8 Claims, 6 Drawing Sheets

(a)

(b)

METHOD AND APPARATUS FOR OPTICAL TRANSMISSION

TECHNICAL FIELD

The present invention relates to optical transmission equipment and method that permit implementation of high-bit-rate long-distance transmissions by use of a Return to Zero (RZ) code for multi-level modulation.

BACKGROUND ART

With the present-day surge in demand for communications, long-distance optical submarine cable systems are now being actively constructed. A transoceanic long-distance optical submarine cable system is usually configured with end-office equipment disposed in a cable landing station at either end of the system and submarine repeaters located at about 50 km repeater spacing.

For efficient transmission of high-volume information over such an optical submarine cable, there is available a wavelength division multiplex (WDM) optical transmission technique. For example, 100-wavelength multiplexing of a signal of a bit rate 10 Gb/s per wavelength will permit transmission of a 1-Tb/s volume of information.

The transmission capacity could be increased by increasing the number of WDM wavelengths. For example, by setting the number of wavelengths at 200, it is mathematically possible to increase the overall transmission capacity of the cable system up to 2 Tb/s.

However, an increase in the number of wavelengths requires doubling the bandwidth of each repeater. With a 0.4 nm wavelength spacing, a 40 nm bandwidth is required for 100 wavelengths; this bandwidth requirement could be met by the provision of an erbium-doped fiber amplifier (EDFA) equipped with a precisely designed gain equalizer, but no means has been found so far for implementing a 80 nm bandwidth necessary for 200 wavelengths.

Another possible solution to this problem is to raise the bit rate per wavelength. For example, if the bit rate per wavelength is increased to 40 Gb/s, the required number of wavelengths for achieving the overall transmission capacity of 2 Tb/s is merely 50 wavelengths, and even if the wavelength spacing is 0.8 nm, a 40 nm bandwidth is enough for the repeater.

To raise the bit rate per wavelength as mentioned above is effective in increasing the overall transmission capacity of the cable system, but it gives rise to a new problem for long-distance transmission.

In general, it is known in the art that the reach over a dispersion transmission line as of an optical fiber decreases in inverse proportion to the square of the bit rate. This means that a 8.000 km distance of transmission at 10 Gb/s goes down to 1/16, that is, 500 km at 40 Gb/s.

The solution of this problem calls for an extremely precise dispersion management and dynamic dispersion compensation control in the end-office equipment, inevitably leasing to an increase in the cost of the entire system. It is also said that transmission is difficult to conduct at the cube of the bit rate owing to a nonlinear phenomenon in the optical fiber (self phase modulation, for instance) as well as the influence of dispersion.

A promising solution to this problem by increasing the transmission rate per unit time without raising the bit rate is a multi-level modulation technique conventionally used in the field of radio transmission. The multi-level modulation is referred to also as an M-ary modulation; according to this scheme, the transmitting side transmits binary information after encoding it into an M-ary signal, and the receiving side decodes it into the binary information.

FIG. 1 is a block diagram showing conventional optical transmission equipment set forth, for example, in "Journal of Lightwave Technology, pp. 2235–2248, vol. 17, no. 11, November 1999." In FIG. 1, reference numeral 1 denotes a binary source for generating binary information; 2 denotes a multi-level encoder for encoding the binary information from the binary source 1 into a multi-level signal; 3 denotes an optical modulator for optical modulation of the multilevel signal encoded by the multi-level encoder circuit 2; 4 denotes an optical fiber transmission line; 5a to 5d denote optical amplifiers; 6 denotes an optical receiver for receiving the multi-level signal sent over the optical fiber transmission line 4; 7 denotes a multi-level decoder for decoding the multi-level signal received by the optical receiver 6 into a multi-level signal to reconstruct the binary information; and 8 denotes the reconstructed binary information.

Next, the operation of the illustrated prior art example will be described below.

Let it assumed here that the binary source 1 generates binary information of a 40 Gb/s bit rate.

On receiving the 40 G/s binary information from the binary source 1, the multi-level encoder encodes the 40 Gb/s binary information to perform a quarternarary amplitude modulation (QAM), and outputs a 20 Gb/s QAM signal.

Upon receiving the 20 Gb/s QAM signal from the multi-level encoding circuit 2, the optical modulator 3 modulates the QAM signal into a 20 Gb/s 4-ary or 4-level NRZ (Non-Return-to-Zero) optical signal, and outputs it onto the optical fiber transmission line 4.

Thereafter, the optical signal is transmitted over the optical fiber transmission line 4 to the optical receiver 6 while being amplified by the optical amplifiers 5a to 5d.

On receiving the 20 Gb/s 4-ary NRZ optical signal, the optical receiver 6 converts it to an electrical 4-ary NRZ signal, and provides it to the multi-level decoder 7.

On receiving the electrical 4-ary NRZ signal from the optical receiver circuit 6, the multi-level decoder 7 decodes the 4-ary NRZ signal to reconstruct the binary information 8.

The above technique is disclosed in "Multi-Level Dispersion Supported Transmission at 20 Gbit/s over 46 km Installed Standard Singlemode Fibre" published by Wedding, et al. in ECO '96, pp. 19–94, 1996, Oslo. Further, the above technique has the advantage that the use of 20 Gb/s optical transmission equipment enables a virtual 40 Gb/s transmission as experimentally verified in G. Veith, "European 40 Gbit/s Field Tests," ECO '99, p. 11–82–83, 26–30, Sep. 1999, Nice. The experiments by G. Veith demonstrate the virtual 40 Gb/s transmission.

With the conventional optical transmission equipment of the above configuration, the optical signal transmission has been proved possible over an about 111 km reach but not proved for a reach in the 8.000 meter class; hence, the prior art equipment has the problem that its application to a transoceanic optical submarine cable system is difficult.

The present invention is intended to solve the above problem, and has for its object to provide optical transmission equipment and method that permit implementation of transoceanic long-distance transmissions.

DISCLOSURE OF THE INVENTION

Optical transmission equipment according to an aspect of the present invention is adapted to perform optical modulation of an encoded signal provided from encoding means for performing RZ encoding and multi-level encoding of binary information.

This permits implementation of transoceanic long-distance transmissions.

Optical transmission equipment according to another aspect of the present invention is adapted so that the encoding means performs the multi-level encoding of the binary information after its RZ encoding.

This permits generation of an encoded signal of restricted intersymbol interference.

Optical transmission equipment according to another aspect of the present invention is adapted so that the encoding means performs RZ encoding of the binary information after its multi-level encoding.

This permits generation of an encoded signal of restricted intersymbol interference.

Optical transmission equipment according to another aspect of the present invention is adapted so that decoding means performs multi-level decoding of the encoded signal after its NRZ decoding.

This permits reconstruction of the binary information.

Optical transmission equipment according to another aspect of the present invention is adapted so that decoding means performs NRZ decoding of the encoded signal after its multi-level decoding.

This permits reconstruction of the binary information.

Optical transmission equipment according to another aspect of the present invention is adapted so that the decoding means performs the NRZ decoding of the encoded signal by use of: a splitter for splitting the encoded signal received by the receiving means; a plurality of discrimination circuits each supplied with a different discrimination threshold value, for comparing the encoded signal split by the splitter with the discrimination value; and a logical circuit for conducting a logical computation based on the results of comparison by the plurality of discrimination circuits.

This permits reduction of the scale of circuitry.

An optical transmission method according to another aspect of the present invention is adapted so that: the transmitting side performs RZ encoding and multi-level encoding of binary information, optically modulates and transmits the encoded signal; and the receiving side performs NRZ decoding and multi-level decoding of the received encoded signal.

This permits implementation of a transoceanic long-distance transmission.

An optical transmission method according to another aspect of the present invention is adapted to perform the RZ encoding by calculating the product of the binary information and a clock.

This permits reduction of the scale of circuitry.

An optical transmission method according to another aspect of the present invention is adapted so that the receiving side performs NRZ decoding of the received encoded signal by: splitting the received encoded signal; comparing the split encoded signals with a plurality of discrimination threshold values; and conducting logical computations based on the results of comparison.

This permits reduction of the scale of circuitry.

An optical transmission method according to still another aspect of the present invention is adapted to perform multi-level encoding of binary information, then RZ encoding of the encoded signal, followed by optical modulation of the encoded signal.

This permits implementation of a transoceanic long-distance transmission.

BEST MODE FOR CARRYING OUT THE INVENTION

To facilitate a better understanding of the present invention, a description will be given, with reference to the accompanying drawings, of the best mode for carrying out the invention.

EMBODIMENT 1

Figure 2:
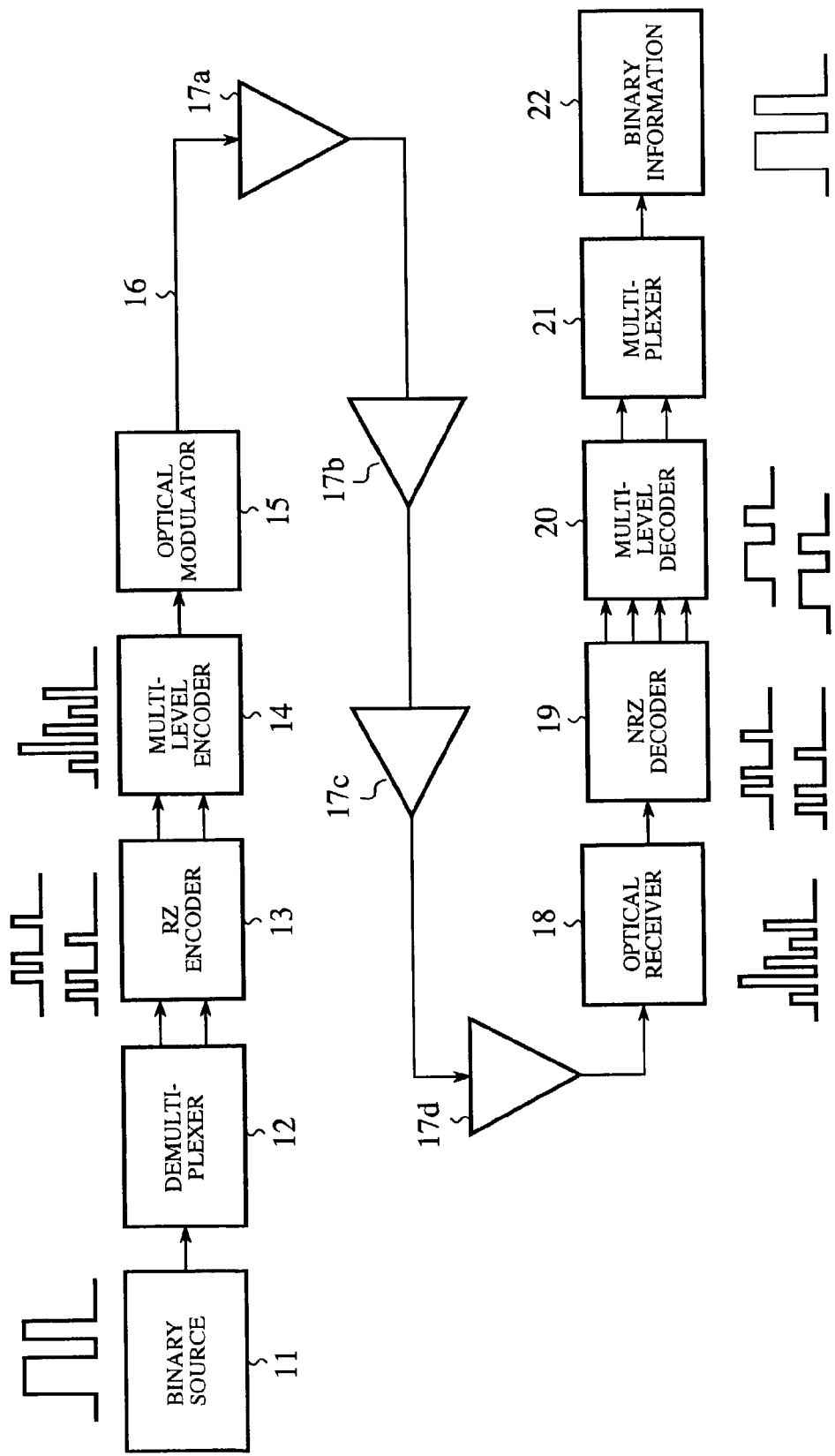
FIG. 2 is a block diagram of optical transmission equipment according to Embodiment 1 of the present invention.

FIG. 2 illustrates in block form the optical transmission equipment according to Embodiment 1 of the present invention. In FIG. 2, reference numeral 11 denotes binary source for generating binary information; 12 denotes a demultiplexer for demultiplexing the binary information fed from the binary source; 13 denotes an RZ encoder for encoding the binary information demultiplexed by the demultiplexer 12 into an RZ signal; and 14 denotes a multi-level encoder for encoding the RZ signal provided from the RZ encoder 13 into a multi-level signal. The RZ encoder 13 and the multi-level encoder 14 constitute encoding means.

Reference numeral 15 denotes an optical modulator (modulating means) for performing optical modulation of the multi-level signal fed from the multi-level encoder 14; 16 denotes an optical fiber transmission line; and 17a to 17d denote optical amplifiers. Incidentally, the optical fiber transmission line 16 and the optical amplifiers 17a to 17d constitute transmitting means.

Reference numeral 18 denotes an optical receiver (receiving means) for receiving he multi-level signal sent over the optical fiber transmission line 16; 19 denotes an NRZ decoder for performing NZR decoding of the multi-level signal received by the optical receiver 18; and 20 denotes a multi-level decoder for performing multi-level decoding of the NRZ-decoded signal fed from the NRZ decoder 19. The NRZ decoder 19 and the multi-level decoder 20 constitute decoding means.

Reference numeral 21 denotes a multiplexer for multiplexing the multi-level decoded signal fed from the multi-level decoder 20, and 22 denotes reconstructed binary information.

Figure 3:
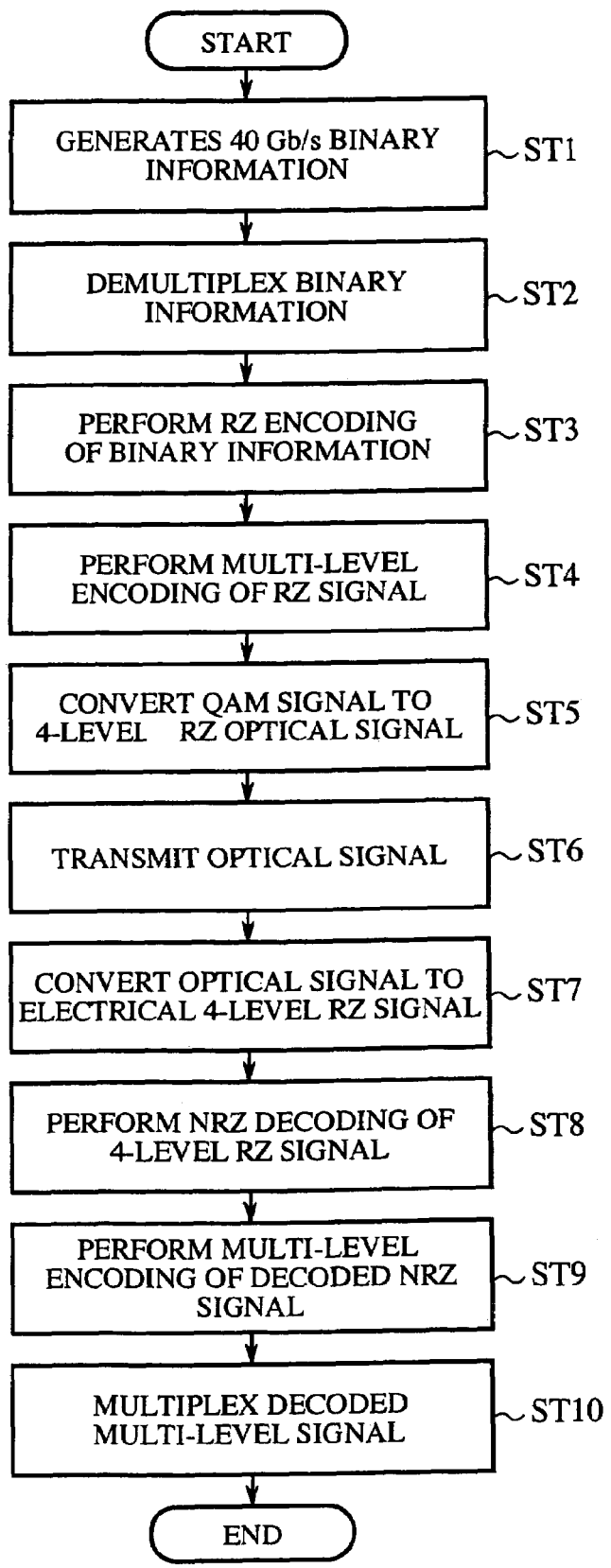
FIG. 3 is a flowchart showing an optical transmission method according to Embodiment 1 of the present invention.

FIG. 3 is a flowchart showing the optical transmission method according to Embodiment 1 of the present invention.

Next, the operation of this embodiment will be described below.

Let it be assumed here that the binary source 11 generates 40 Gb/s binary information. Needless to say, Embodiment 1 is applicable as well to other bit rates than 40 Gb/s.

On generating the 40 Gb/s by the binary source 11 (step ST1), the demultiplexer 12 demultiplexes the 40 Gb/s binary information (step ST2).

On demultiplexing the 40 Gb/s binary information by the demultiplexer 12, the RZ encoder 13 encodes the binary information into an RZ (Return-to-Zero) signal (step ST3).

On the RZ encoder RZ 13 performing RZ encoding of the binary information, the multi-level encoder 14 encodes the RZ signal into a multi-level signal to perform quaternary amplitude modulation (QAM) and yields 20 Gb/s QAM signal (step ST4).

On the multi-level encoder 14 providing the 20 Gb/s QAM signal, the optical modulator 15 converts the QAM signal to a 20 Gb/s 4-level RZ optical signal and outputs it onto the optical fiber transmission line 16 (step ST5).

As a result, the optical signal is transmitted over the optical fiber transmission line 16 to the optical receiver 18 while being amplified by the optical amplifiers 17a to 17d (step ST6).

On receiving the 20 Gb/s 4-level optical signal, the optical receiver 18 converts the optical signal to an electrical 4-level RZ signal and provides it to the NRZ decoder 19 (step ST7).

On receiving the electrical 4-level RZ signal from the optical receiver 18, the NRZ decoder 19 decodes the 4-level RZ signal to an NRZ signal (step ST8).

On the NRZ decoder performing NRZ decoding of the 4-level RZ signal, the multi-level decoder 20 decodes the NRZ decoded signal into a multi-level signal (step ST9).

On receiving the multi-level decoded signal from the multi-level decoder 20, the multiplexer 21 multiplexes the multi-level decoded signal to reconstruct the 40 Gb/s binary signal 22 (step ST10).

Figure 4:
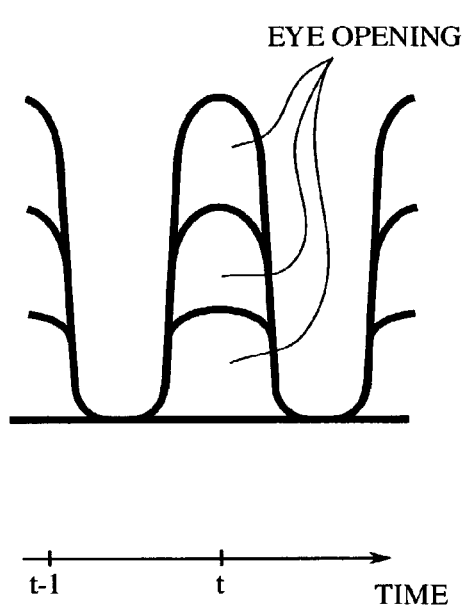
FIG. 4 is an explanatory diagram showing waveforms of optical signals that are transmitted over an optical fiber line 6.
Figure 4:
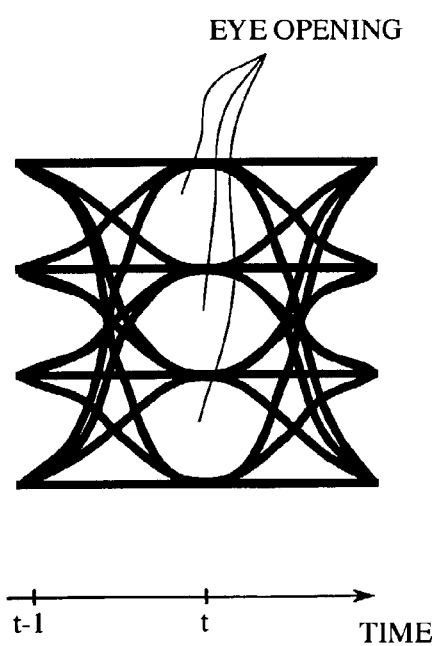

FIG. 4 shows eye patterns of optical signals transmitted over the optical fiber transmission line 16, (a) depicting QAM waveforms of the RZ coding scheme and (b) QAM waveforms of the conventional NRZ coding scheme.

In the case of the conventional NRZ waveform, since the signal level does not go down to zero during signal transition from time t–1 to 1, it is difficult to obtain sufficient eye openings, inevitably leading to serious intersymbol interference.

In contrast thereto, in the case of the QAM waveform by the RZ coding scheme, since the signal level always goes down to zero during signal transition from time t–1 to t, it is possible to obtain excellent eye openings relatively free from intersymbol interference.

Further, the higher the bit rate is, the more difficult is it to implement an ideal transfer function with a roll-off characteristic in the optical receiver; the 4-level NRZ coding scheme encounters difficulty in obtaining satisfactory eye openings, but the RZ coding scheme reduces trailing of each pulse, enabling the intersymbol interference to be restricted accordingly even when the transfer function is not ideal.

Moreover, another advantage of the RZ coding scheme appears in wavelength multiplexing transmission, in particular, in high-power long-distance transmission. The wavelength multiplexing transmission entails a cross phase modulation as a nonlinear phenomenon of the optical fiber that must be taken into account. This causes a waveform distortion of a signal of a certain wavelength through phase modulation with a refractive index variation caused by a signal of a different wavelength.

In general, in the case of the NRZ coding scheme, when the mark ratio is assumed to be ½ and the rise/fall time is ignored, the time for which the signal remains at "1" is 0.5 per unit time—this is likely to incur the cross phase modulation.

On the other hand, in the case of the RZ coding scheme, the "1" state per unit time is 0.25, just one half that in the NRZ coding scheme—this shortens the time for the phase modulation, suppressing the occurrence of cross phase modulation.

Besides, the use of the multi-level modulated signal permits reduction of the problem that the wavelength dispersion of the optical fiber generally reduces the reach in inverse proportion to the square of the bit rate. For example, the 20 Gb/s QAM signal can be transmitted over a distance four times longer than a binary 40 Gb/s signal.

As is apparent from the above, Embodiment 1 is adapted to perform RZ encoding and multi-level encoding of binary information and conduct optical modulation of the encoded signal, and hence permitting implementation of a transoceanic long-distance transmission.

EMBODIMENT 2

While in Embodiment 1 described above the multi-level encoder 14 is placed at the stage following the RZ encoder 13, the multi-level encoder 14 may be provided at the stage preceding the RZ encoder 13, in which case, too, the same results as mentioned above in respect of Embodiment are obtainable.

Further, in Embodiment 1 the multi-level decoder 20 is placed at the stage following the NRZ decoder 19, but the multi-level decoder 20 may be provided at the stage preceding the NRZ decoder 19, in which case, too, the same results as mentioned above in respect of Embodiment are obtainable.

EMBODIMENT 3

Figure 5:
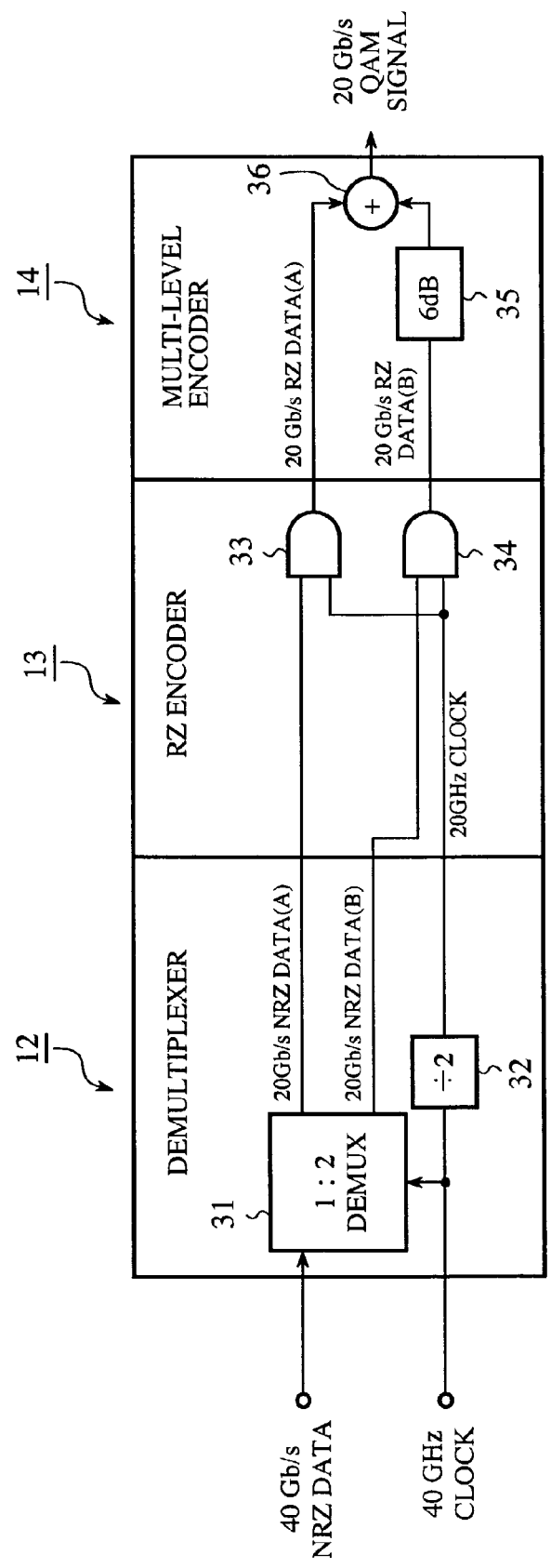
FIG. 5 is a block diagram illustrating the internal configurations of a demultiplexer 12, an RE encoder 13 and a multi-level encode 14.

FIG. 5 is a block diagram illustrating the internal configurations of the demultiplexer 12, the RZ encoder 13 and the multi-level encoder 14. In FIG. 5, reference numeral 31 denotes a 1:2 demultiplexer which demultiplexes, by use of a 40 GHz clock, the 40 Gb/s binary information (referred to as 400 Gb/s NRZ data in this case) from the binary source 11 at a 1:2 ratio and outputs two pieces of 20 Gb/s NRZ data. For convenience of description, the one NRZ data will be referred to 20 Gb/s NRZ data (A), and the other NRZ data as 20 Gb/s NRZ data (B). Reference numeral 32 denotes a frequency divider that frequency-divides the 40 Gb/s clock and outputs a 20 Gb/s clock.

Reference numeral 33 denotes an AND circuit which calculates the product of the 20 Gb/s NRZ data (A) and the 20 GHz clock and outputs 20 Gb/s RZ data (A); 34 denotes an AND circuit which calculates the product of the 20 Gb/s NRZ data (B) and the 20 GHz clock and outputs 20 Gb/s RZ data (B); 35 denotes a 6 dB attenuator for attenuating the amplitude the 20 Gb/s RZ data (B) from the AND circuit 34 by half; and 36 denotes an adder that adds the 20 Gb/s RZ data (B) amplitude-attenuated by the 6 dB attenuator 36 and the 20 Gb/s RZ data (A) and outputs a 4-level QAM signal.

Next, the operation of this embodiment will be described below.

On generating the 40 Gb/s NRZ data by the binary source 11, the 1:2 demultiplexer 31 demultiplexes the 40 Gb/s NRZ data at the 1:2 ratio by use of the 40 GHz clock, and outputs the 20 Gb/s NRZ data (A) and the 20 Gb/s NRZ data (B).

On the other hand, the frequency divider 32 frequency-divides the 40 GHz clock and outputs the 20 GHz clock.

Next, the AND circuit in the RZ encoder 13 calculates the product of the 29 Gb/s NRZ data (A) from the 1:2 demultiplexer 31 and the 20 GHz clock from the frequency divider 21 to thereby convert the NRZ code to the RZ code, and outputs the 20 Gb/s RZ data (A).

Similarly, the AND circuit 34 calculates the product of the 29 Gb/s NRZ data (B) from the 1:2 demultiplexer 31 and the 20 GHz clock from the frequency divider 21 to thereby convert the NRZ code to the RZ code, and outputs the 20 Gb/s RZ data (B).

Next, the 6 dB attenuator 35 in the multi-level encoder 14 attenuates the amplitude of the 20 Gb/s RZ data (B) from the AND circuit 34 by half, and outputs the amplitude-attenuated data.

The adder 36 in the multi-level encoder 14 adds the 20 Gb/s RZ data (B) attenuated by the 6 dB attenuator 35 and the 20 Gb/s RZ data (A), and outputs the 4-level QAM signal.

The subsequent operations are the same as those in Embodiment 1, and no description will be given of them.

With the FIG. 5 circuit configuration, the 40 Gb/s signal needs only to be handled in the 1:2 demultiplexer 31 and the frequency divider 32.

The 1:2 demultiplexer 31 handles the NRZ code, and hence it can be implemented by relative low-speed transistors. And the frequency divider 32 can easily be implemented by a toggle flip-flop circuit.

In the circuit of the stage following the AND circuits 33 and 34, although the bit rate is 20 Gb/s, a bandwidth corresponding to 40 Gb/s or so is needed since the RZ code requires a band about twice wider than that of the NRZ code. However, since the above-mentioned circuit can be implemented only by the adder 36 that can easily be formed by a combination of a simple AND circuit and three resistors, the circuit even for 40 Gb/s can be easily implemented without increasing costs.

As described above, the FIG. 5 circuit configuration provides the 20 Gb/s QAM circuit by relatively small-scale and simple-structured logical circuits.

EMBODIMENT 4

Figure 6:
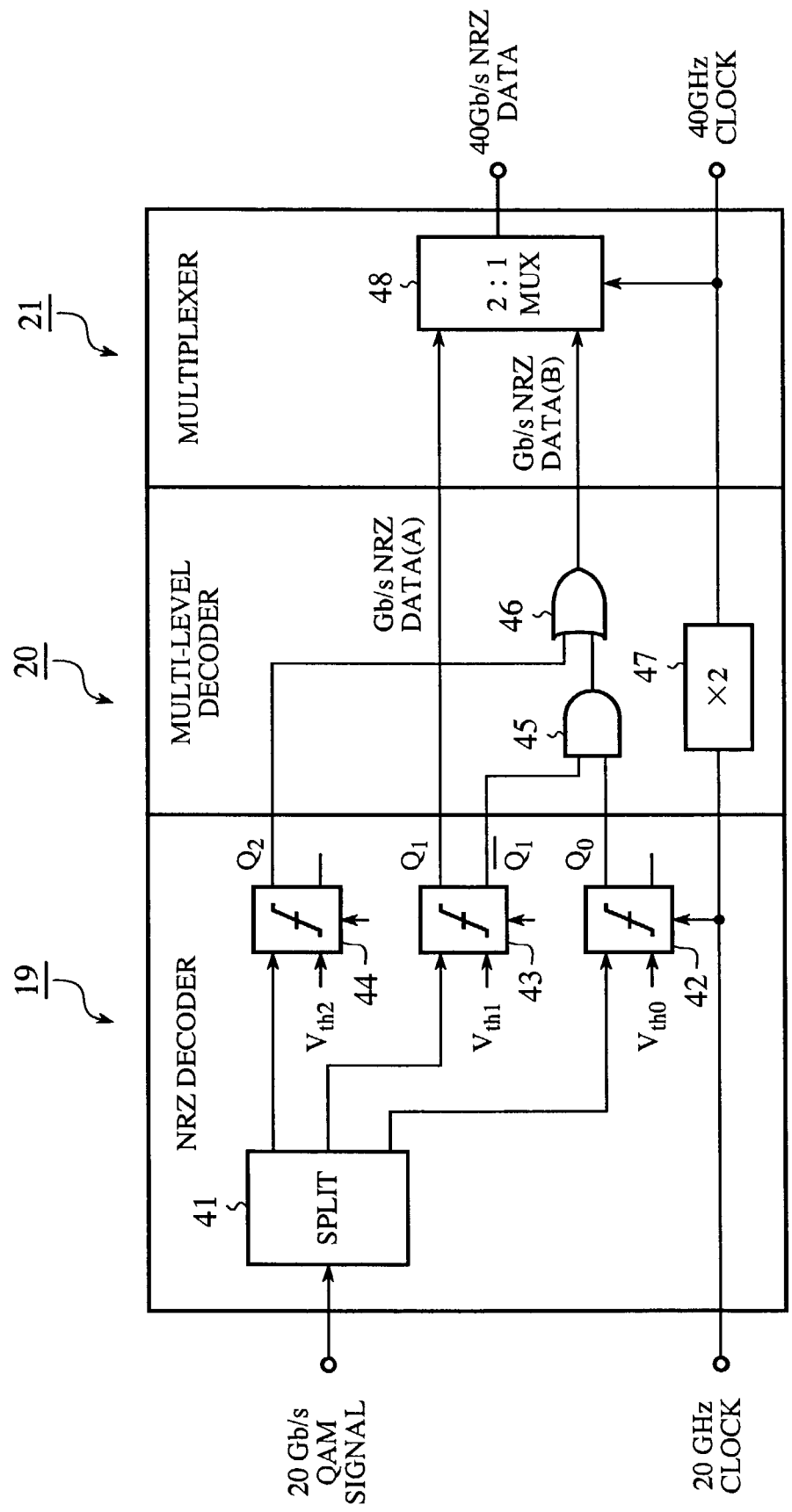
FIG. 6 is a block diagram illustrating the internal configurations of an NRZ decoder 19, a multi-level decoder 20 and multiplexer 21.

FIG. 6 is a block diagram illustrating the internal configuration of the NRZ decoder 19, the multi-level decoder 20 and the multiplexer 21. In FIG. 6, reference numeral 41 denotes a splitter that splits the 20 Gb/s QAM signal from the optical receiver 18 into three equal portions and outputs them; 42 denotes a discrimination circuit that compares the QAM signal fed from the splitter 41 and a discrimination threshold value $V_{th0}$; 43 denotes a discrimination circuit that compares the QAM signal fed from the splitter 41 and a discrimination threshold value $V_{th1}$; 44 denotes a discrimination circuit that compares the QAM signal fed from the splitter 41 and a discrimination threshold value $V_{th2}$; 45 denotes an AND circuit that is a logic circuit for computing the AND of the negative-phase output from the discrimination circuit 43 with the positive-phase output from the discrimination circuit 42; 46 denotes an OR circuit that is a logic circuit for calculating the logical OR of the positive-phase output from the discrimination circuit 44 with the output from the AND circuit 45; 47 denotes a multiplier that multiplies the 20 GHz and outputs a 40 GHz clock; and 48 a 2:2 multiplexer that reconstitutes the 40 Gb/s binary information by multiplexing the 20 Gb/s NRZ data (A) from the discrimination circuit 43 and the 20 Gb/s NRZ data (B) from the OR circuit 46 at the 2:1 ratio by use of the 40 GHz clock.

Next, the operation of this embodiment will be described below.

On receiving the 20 Gb/s QAM signal by the optical receiver 18, the splitter 41 splits the 20 Gb/s QAM signal into three equal portions and provides them to the discrimination circuits 42 to 44, respectively.

The discrimination circuit 42 compares the QAM signal from the splitter 42 with the discrimination threshold value $V_{th0}$, and provides its positive-phase output to the AND circuit 45.

The discrimination circuit 43 compares the QAM signal with the discrimination threshold value $V_{th1}$ and provides the positive-phase output to the 2:1 multiplexer 48 and the negative-phase output to the AND circuit 45.

The discrimination circuit 44 compares the QAM signal from the splitter 41 with the discrimination threshold value $V_{th2}$ and provides the positive-phase output to the OR circuit 46.

The discrimination threshold values of the discrimination circuits bear such a relationship as $V_{th2} > V_{th1} > V_{th0}$.

Then, the AND circuit 45 computes the AND of the negative-phase output from the discrimination circuit 43 with the positive-phase output from the discrimination circuit 42, and provides the AND output to the OR circuit 46.

The OR circuit 46 computes the logical OR of the positive-phase output from the discrimination circuit 42 with the AND output from the AND circuit and supplies the 2:2 multiplexer 48 with the 20 Gb/s NRZ data (B) that is the computed logical value.

Next, the 2:1 multiplexer 48 reconstitutes the 40 Gb/s binary information by multiplexing the 20 Gb/s NRZ data (A) from the discrimination circuit 43 and the 20 Gb/s NRZ data (B) from the logical circuit 46 at the 2:1 ratio by use of the 40 GHz clock.

With the FIG. 6 circuit configuration, the 40 Gb/s signal needs only to be handled in the 1:2 demultiplexer 48 and the multiplier 47.

The 1:2 demultiplexer 31 handles the NRZ code, and hence it can be implemented by relative low-speed transistors. And the multiplier 47 can easily be implemented by a microwave mixer.

As described above, the FIG. 5 circuit configuration provides the 20 Gb/s QAM circuit by relatively small-scale and simple-structured logical circuits.

Figure 1:
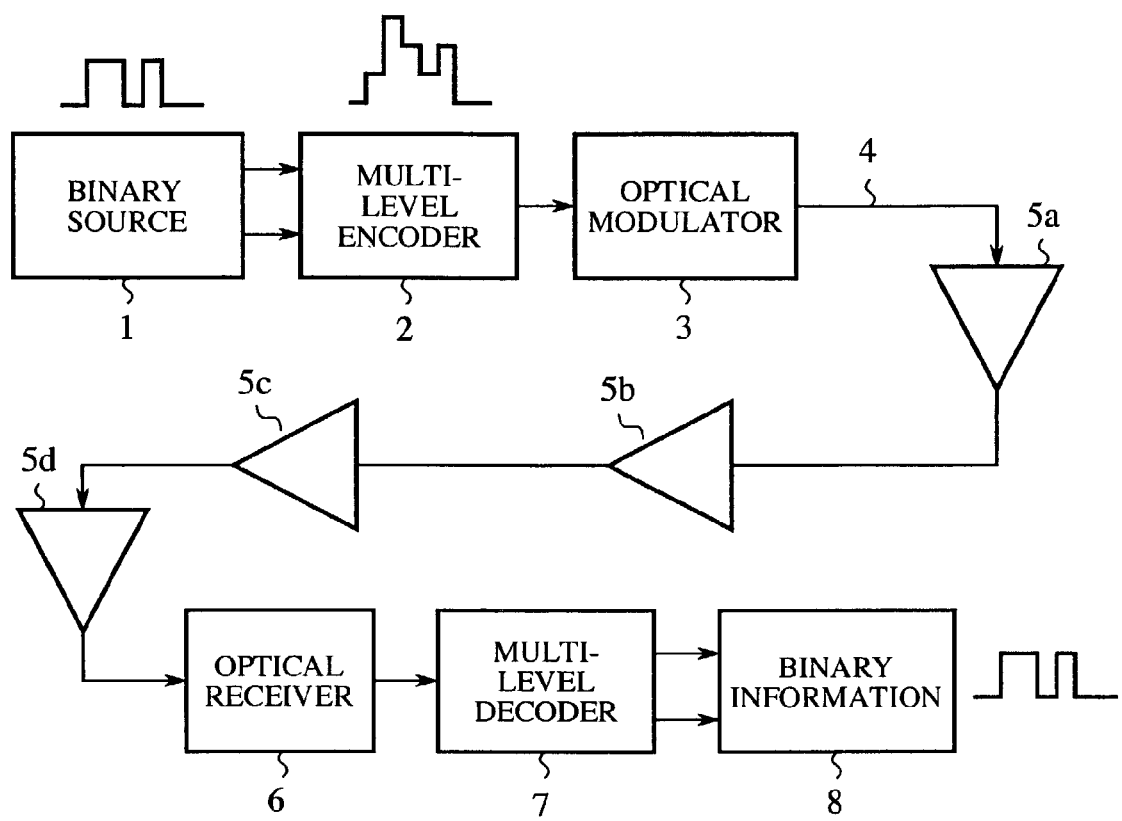
FIG. 1 is a block diagram of conventional optical transmission equipment.
Figure 7:
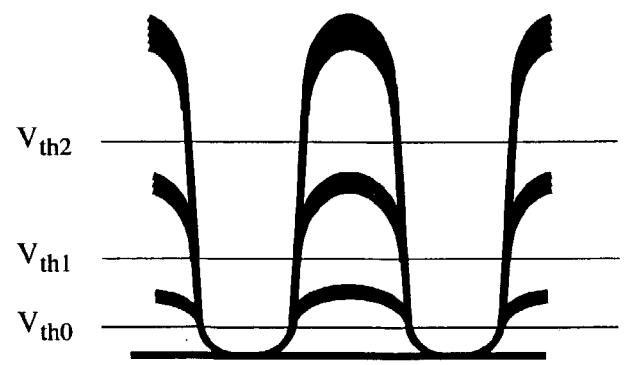
FIG. 7 is a diagram conceptually showing the relationships of discrimination threshold values.

In the system using optical amplifying repeaters, of four levels 3, 2, 1 and 0 of the 4-level electrical signal obtainable in the optical receiver 18, the level 3 has the largest dispersion (a noise distribution) and the dispersion decreases as the level lowers to 2, 1 and 0 (see FIG. 7).

Since beat noise of the signal light and spontaneously emitted light from optical amplifying repeaters is dominant the dispersion also increases as the level of the signal power rises. Accordingly, it is desirable that the four levels be set in the transmitting side that their spacing is the widest between the level 3 and 2, the second widest between the levels 2 and 1 and smallest between the levels 1 and 0. Accordingly, it is preferable that the discrimination threshold value at the receiving side be also set at irregular intervals as depicted in FIG. 7.

INDUSTRIAL APPLICABILITY

As described above, the optical transmission equipment and method according to the present invention implement the multi-level modulated signal by use of the RZ code, and hence permit high-sensitivity reception of a wavelength multiplexed signal transmitted over an ultra-long distance while minimizing the influence of the cross phase modulation. Hence, the present invention is suitable for use in a high-volume) wavelength multiplexing optical transmission system.

The invention claimed is:

1. Optical transmission equipment comprising:
    a source configured to output binary information;
    an encoder configured to perform RZ encoding and multi-level encoding of said binary information;
    a modulator configured to perform RZ optical modulation of the encoded signal from said encoder;
    a transmitter configured to transmit the encoded signal optically modulated by said modulator;
    a receiver configured to receive the encoded signal transmitted by said transmitter; and
    a decoder configured to perform NRZ decoding and multi-level decoding of the encoded signal received by said receiver, wherein said decoder performs the NRZ decoding before the multi-level decoding of the encoded signal; and
    a multiplexer configured to multiplex the decoded multi-level signal and output the binary information.

2. The optical transmission equipment of claim 1, wherein:
    said encoder is configured to perform said multi-level encoding after performing RZ encoding of said binary information.

3. The optical transmission equipment of claim 1, wherein:
    said encoder is configured to perform the RZ encoding of said binary information by use of an AND circuit for computing the product of said binary information and a clock.

4. The optical transmission equipment of claim 1, wherein said decoder configured to perform NRZ decoding of the encoded signal comprises:
    a splitter configured to split the encoded signal received by said receiver;
    a plurality of discrimination circuits each supplied with a different discrimination threshold value, configured to compare the encoded signal split by said splitter with said discrimination threshold value; and
    a logical circuit configured to conduct a logical computation based on the results of comparison by said plurality of discrimination circuits.

5. An optical transmission method wherein:
    a transmitting side
        receives binary information;
        performs RZ encoding and multi-level encoding of said binary information;
        RZ optical modulates and transmits the encoded signal; and
        transmits the optical modulated encoded signal; and
    a receiving side
        receives the optical modulated and encoded signal;
        performs NRZ decoding and multi-level decoding of the received encoded signal, wherein the NRZ decoding is performed before the multi-level decoding of the encoded signal; and
        multiplexes the multi-level signal and outputs the binary information.

6. The optical transmission method of claim 5, wherein:
    the transmitting side performs the RZ encoding by calculating the product of the binary information and a clock.

7. The optical transmission method of claim 5, wherein the receiving side:
    splits the received encoded signal;
    compares the split encoded signals with a plurality of discrimination threshold values; and
    conducts logical computations based on the results of comparison to thereby performing NRZ decoding of the encoded signal.

8. Optical transmission equipment comprising:
    means for outputting binary information;
    means for performing RZ encoding and multi-level encoding of said binary information;
    means for performing RZ optical modulation of the encoded signal from said means for performing RZ encoding;
    means for transmitting the encoded signal optically modulated by said means for performing RZ optical modulation;
    means for receiving the encoded signal transmitted by said means for transmitting;
    means for performing NRZ decoding and multi-level decoding of the encoded signal received by said means for receiving, wherein said means for performing NRZ decoding performs the NRZ decoding before the multi-level decoding of the encoded signal; and
    means for multiplexing the decoded multi-level signal and for outputting the binary information.

* * * * *